United States Patent

[11] 3,593,072

| [72] | Inventor | Richard Rolland Bailey<br>Ogallala, Nebr. |
|---|---|---|
| [21] | Appl. No. | 878,129 |
| [22] | Filed | Nov. 19, 1969 |
| [45] | Patented | July 13, 1971 |
| [73] | Assignee | TRW, Inc.<br>Los Angeles, Calif. |

[54] METALLIZED CAPACITOR
3 Claims, 4 Drawing Figs.

[52] U.S. Cl.................................................. 317/243,
317/260
[51] Int. Cl................................................... H01g 1/08
[50] Field of Search........................................ 317/260,
243, 242

[56] References Cited
UNITED STATES PATENTS

| 697,507 | 4/1902 | Mansbridge.................. | 317/260 |
| 2,323,020 | 6/1943 | Dorn............................ | 317/260 |
| 2,539,332 | 1/1951 | Schneider..................... | 317/260 |
| 2,939,060 | 5/1960 | Cotton.......................... | 317/260 |

FOREIGN PATENTS

| 453,939 | 9/1936 | Great Britain................ | 317/260 |
| 493,070 | 10/1938 | Great Britain................ | 317/243 |

*Primary Examiner* — E. A. Goldberg
*Attorney* — Spensley, Horn & Lubitz

ABSTRACT: A capacitor utilizing metallized dielectric layers. A surface of a dielectric layer is coated with a metal film. A plurality of layer of the metallized dielectric are stratified whereby the metallized surface of a dielectric layer is in substantial abutment with the metallized surface of another dielectric layer, the metallized surface not contacting a nonmetallized surface. An offset in the stratification establishes two electrodes. After convolutely winding the plurality of stratified, metallized dielectric layers, electrical contact is made to the two electrodes.

PATENTED JUL 13 1971

3,593,072

INVENTOR.
RICHARD ROLLAND BAILEY,
BY HIS ATTORNEYS
Spensley & Horn

METALLIZED CAPACITOR

BACKGROUND OF THE INVENTION

1. Field of the Invention

The present invention metallized capacitor relates generally to the field of metal film capacitors, and more specifically to those adapted for high AC power application.

2. Prior Art

The utilization of metallized dielectric for the fabrication of a capacitor is disclosed by the prior art. In addition, the use of multiple layers of nonmetallized dielectric in combination with the metallized dielectric layers is disclosed by the prior art, the structure permitting use of the fabricated capacitor in higher voltage ranges. There are many problems which have not been solved by the devices disclosed by the prior art. In the case wherein a metallized dielectric layer is used in conjunction with nonmetallized dielectric layers, the metallized surface of the former contacting the nonmetallized surface of the latter, convolutely winding the layers will result in detrimental air gaps between the contacting layers. The entrapment of air or other vapor between the metallized and nonmetallized layers affects the capacitance of the structure. Another problem left unresolved by the devices disclosed by the prior art is the heat dissipation characteristics. When the capacitor is used in high power applications, the thickness of the metallized film limits the effective use of the device.

The present invention metallized capacitor significantly reduces the problems left unresolved by the prior art. The entrapment of air or vapor between homogeneous layers does not create the detrimental effect produced by the contact of heterogeneous materials. The heat dissipation problem is reduced by the structure of the present invention. The metallized surfaces are adjacent, therefore, the metal current carrying material is much thicker without having to resort to thicker films, a procedure which obviates difficult production problems and severe operational problems.

SUMMARY OF THE INVENTION

It is an object of the present invention to provide a capacitor adapted for high AC power applications.

It is another object of the present invention to provide a capacitor which will have a temperature coefficient of capacitance which has reduced variation with temperature.

It is yet another object of the present invention to provide a capacitor which utilizes metallized dielectric layers where only homogeneous interface are maintained.

It is still yet another object of the present invention to provide a convolutely wound metallized capacitor which has good heat dissipation, high voltage and high frequency characteristics.

The present invention capacitor is comprised of four dielectric layers. The dielectric layers are metallized on one surface thereof and aligned in pairs. The metallized surfaces of each of two metallized dielectric layers are then abutted at the nonmetallized surfaces thereof which are opposite the metallized surfaces. The stratified, metallized dielectric layers are convolutely wound and electrical terminals are secured to the pair of metal electrodes, the electrodes being established by an offset in the stratified metallized layers. Since there is no interface at which the metallized surface of one metallized dielectric layer contacts the nonmetallized surface of another, there is a significant reduction in the amount of entrapped air or other vapors which can affect the capacitance of the device.

The present invention capacitor structure eliminates the entrapment of air or other vapors between metallized and nonmetallized surfaces of the metallized dielectric layers. The entrapment of air is eliminated by removing the interface itself. The interface of metal to metal or dielectric to dielectric is not subject to the above problem. The reduction of air gaps as a problem reduces the variation of capacitance which would occur in the presence of the detrimental air gaps.

The novel features which are believed to be characteristic of the invention, both as to its organization and method of operation, together with further objectives and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figure 1:
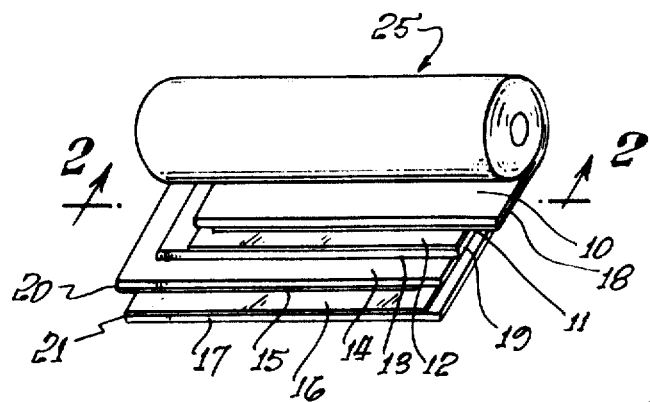
FIG. 1 is a partially unwound capacitor structure illustrating the convolutely wound layers of metallized dielectric.
Figure 2:
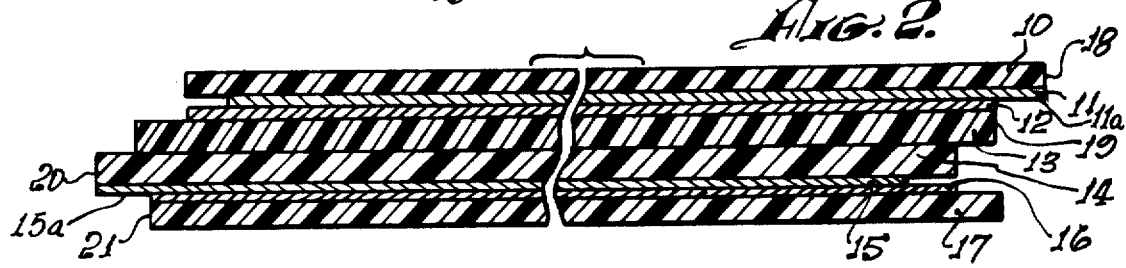
FIG. 2 is an enlarged cross-sectional view of the laminated metallized dielectric layers taken through line 2-2 of FIG. 1.

The present invention metallized capacitor can be best understood by reference to FIG. 1 and FIG. 2, wherein a partially unwound capacitor and cross section thereof are shown as the same, and fabricated in accordance with the present invention. A portion of one surface of the dielectric sheets 10, 13, 14 and 17 are covered by a metallic coating 11, 12, 15 and 16 respectively. The margins provided on each of the metallized dielectric sheets extend the length of one of the longitudinal edges of the dielectric sheets 10, 13, 14 and 17 and prevent the occurrence of destructive voltage breakdowns at the edges of the capacitor. The metallized dielectric layers 18 and 19 are aligned with the respective metallized coatings 11 and 12 adjacent one another, however, the metallized dielectric layers 18 and 19 are laterally offset to extend the metallized electrodes comprised of the metallized coatings 11 and 12 to the right portion of the capacitor 25. The offset registration facilitates establishing electrical contact to the metallized coating 11 in the region 11a. The metallized dielectric layers 20 and 21 are aligned with the respective metallized coatings 15 and 16 adjacent one another, however, the metallized dielectric layers 20 and 21 are laterally offset to extend the metallized electrodes comprised of the metallized coatings 15 and 16 to the left portion of the capacitor 25. The offset registration, as set forth above facilitates establishing electrical contact to the metallized coating 15 in the region 15a. The nonmetallized surfaces of the dielectric sheets 13 and 14 of the metallized dielectric layers 19 and 20 are aligned adjacent one another and laterally offset to provide the proper orientation of the electrodes.

After the metallized dielectric layers 18, 19, 20 and 21 are disposed upon one another as set forth hereinabove, the laminations are convolutely wound to form the capacitor structure 25. The electrodes are accessible at the lateral ends of the capacitor structure 25, contact being made at the metallized coating regions 11a and 15a.

The dielectric sheets 10, 13, 14 and 17 are comprised of a known, suitable material adequate to provide the dielectric constant necessary in the specific application. A suitable material for the capacitor 25 has a high dielectric constant and is quite thin thereby providing for miniaturization. The materials used in the present invention capacitor structure 25 are such conventional materials as polycarbonate, polystyrene, polyurethane or polyesters.

The metallized coatings 11, 12, 15 and 16 are disposed upon the dielectric 10, 13, 14 and 17 respectively by conventional, known methods such as vacuum evaporation, the deposition method not being part of the present invention. The metal used for the metallized coatings 11, 12, 15 and 16 is a conventional metal such as zinc, aluminum, lead or silver, the specific metal used not being part of the present invention.

The structure of the present invention capacitor enables the fabrication of a device which will be less subject to the deficiencies of the prior art devices. By forming a metal-to-metal interface between the metallized dielectric layers 18 and 19 and also between the metallized dielectric layers 20 and 21, and by establishing the interface between the nonmetallized surfaces of the metallized dielectric layers 19 and 20, the stratified structure contains no interface between a metallized coating and a nonmetallized surface of two different dielectric layers. By eliminating this type of interface, the entrapment of air or other vapor between the metallized dielectric layers 18, 19, 20 and 21 will not yield the detrimental effect found in prior art devices. When air or other vapor is entrapped at the interface of metal and nonmetal surfaces, the dielectric constant of the structure is not stable, and thereby produces a temperature coefficient of capacitance which will vary over a wide range of temperatures or frequency.

Although it would be obvious that the dielectric sheets 13 and 14 could be combined into a single dielectric sheet, the use of two substantially adjacent sheets is preferable. One of the frequent causes of capacitor failures is the occurrence of fissures or pin holes in the dielectric sheet. By using two dielectric sheets 13 and 14, the probability of fissures or pin holes occuring at the same location is diminished. This becomes very important in high power applications where electrical arcing is a material consideration.

Figure 3:
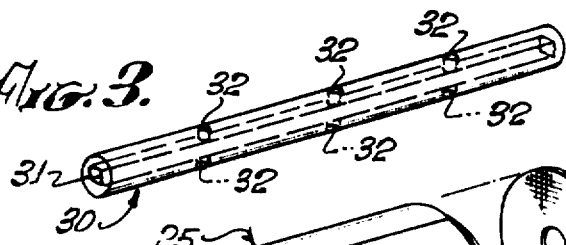
FIG. 3 illustrates a core member utilized with an embodiment of the present invention.
Figure 4:
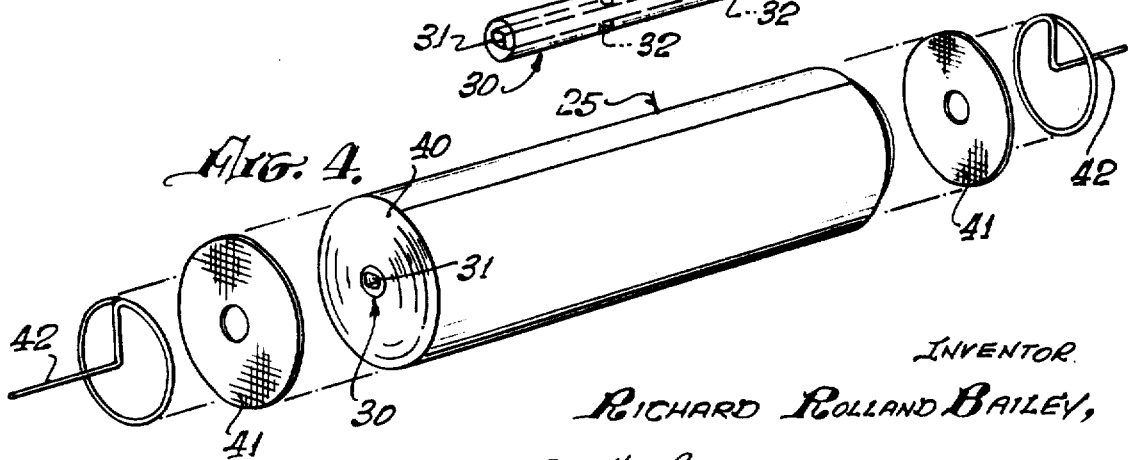
FIG. 4 is an exploded assembly view of a presently preferred embodiment of a capacitor fabricated in accordance with the present invention.

A preferred embodiment of the present invention metallized capacitor can be best understood by reference to FIG. 3 and FIG. 4. To fabricate the capacitor 25, the metallized dielectric layers 18, 19, 20 and 21 are convolutely wound, as shown in FIG. 1, and then subjected to thermoprocessing. One of the problems which arises during thermoprocessing is that the metallized dielectric tends to shrink thereby causing destructive wrinkling to occur in the dielectric. FIG. 3 illustrates a typical core member 30 which is utilized to prevent wrinkling of the dielectric layers. The cylindrical core member 30 has an orifice 31 disposed through the core member 30, the orifice 31 having a plurality of perpendicular, depending apertures 32 extending to the cylindrical surface of the core member 30. When the capacitor 25 is subjected to thermoprocessing the core member 30 will prevent shrinking of the metallized dielectric layers 18, 19, 20 and 21. In addition, if the present invention capacitor 25 is being used in operation or during fabrication under high power or high frequency conditions or any other case where heat dissipation is a material consideration, the orifice 31 and the depending apertures 32 provide means to cool the core member 30 and the adjacent material.

FIG. 4 illustrates an exploded assembly view of a preferred embodiment of the present invention metallized capacitor structure 25. The metallized dielectric layers 18, 19, 20 and 21 are convolutely wound upon the core member 30, the end portions 40 thereof presenting the metallized electrodes comprising the metallized layers 11 and 12 at one end portion 40 and the metallized layers 15 and 16 at the opposite end portion 40. A metallic end coating is disposed upon the end portion 40 by conventional, known methods such as a sprayable solder flux known in the industry as schooping. The wire terminals 42 are soldered or otherwise bonded to the metal mesh screen 41, the connection between the terminals 42 and the mesh screen 41 being by conventional, known methods. The metal screen 41 is fabricated of a suitable contact metal such as copper. The assembly of the terminal 42 and the mesh screen 41 is then secured to the end portions 40. It is emphasized that the present invention metallized capacitor structure 25 could be provided with solderable metal caps or other suitable means to make electrical connections to the electrodes at the end portions 40.

The preferred embodiment illustrated in FIG. 4 provides a simplified and more advantageous means to secure electrical terminals to the capacitor structure 25. The prior art devices typically bond the lead head directly to the schooping material thereby creating a detrimental dependence on the solder bond between the lead head and the schooping material. The structure shown in FIG. 4 yields a more secure connection in that the broader area covered by the mesh screen 41 provides a more extensive mutual engagement between the solder, schooping material and mesh screen 41.

I claim:

1. A capacitor comprising:
   a. first and second dielectric layers;
   b. a metallized coating disposed upon a portion of each of said first and second dielectric layers, an unmetallized portion extending along a longitudinal edge of said first and second dielectric layers;
   c. a third dielectric layer having a top and bottom surface;
   d. a cylindrical core member having an orifice axially disposed therethrough and having a plurality of apertures radially extending from said orifice to the surface of said core member;
   e. a metallized coating disposed upon a portion less than the whole of each of the top and bottom surfaces of said third dielectric layer, an unmetallized portion of the top and bottom surfaces of said third dielectric layer being along laterally opposite longitudinal edges of said dielectric layer, said metallized coating on the top surface of said third dielectric layer contacting the metallized layer disposed on said first dielectric layer, the metallized coating on the bottom surface of said third dielectric layer contacting the metallized coating disposed on said second dielectric layer, said unmetallized portions of respective contacting pairs being aligned in offset lateral registration, said dielectric layers being convolutely wound a plurality of times about said core member and having end portions exposing respective metallized coatings, and
   f. an electrical contact secured to each of the end portions of said pairs of metallized coatings, said electrical contact including a metal mesh screen having an axially disposed aperture concentric to said core member, a wire terminal secured to said metal mesh screen and a metallic layer disposed upon the end portion whereby electrical contact between said metal mesh screen and said metallized coatings is established.

2. A capacitor as in claim 1 wherein said third dielectric layer comprises at least two parallel, substantially adjacent layers of dielectric.

3. A capacitor comprising:
   a. four dielectric layers;
   b. a cylindrical core member having an axially disposed orifice therethrough, and having a plurality of apertures radially extending from said orifice to the surface of said core member;
   c. a metallized coating disposed upon a portion less than the whole of a face of each of said dielectric layers, the unmetallized portion being at a longitudinal edge thereof, the metallized portions of each of two pairs of said dielectric layers being substantially adjacent, the unmetallized portions of each substantially adjacent pair being aligned in offset lateral registration, an unmetallized face of one of each pair of dielectric layers in substantial abutment, the unmetallized portions of each pair of dielectric layers being at opposite longitudinal edges, said dielectric layers convolutely wound a plurality of times about said core member, and having end portions exposing respective metallized coatings; and
   d. an electrical contact secured to each of the end portions of each of said contacting pairs of metallized coatings, said electrical contact including a metal mesh screen having an axially disposed aperture concentric to said core member, a wire terminal secured to said metal mesh screen and a metallic layer disposed upon the end portion whereby electrical contact between said metal mesh screen and said metallized coating is established.